United States Patent
Haag et al.

(10) Patent No.: US 9,618,791 B2
(45) Date of Patent: Apr. 11, 2017

(54) OPTICAL STACK WITH ASYMMETRIC DIFFUSER

(71) Applicant: 3M INNOVATIVE PROPERTIES COMPANY, St. Paul, MN (US)

(72) Inventors: Adam D. Haag, Woodbury, MN (US); Tri D. Pham, Woodbury, MN (US); Steven H. C. Kong, Woodbury, MN (US); Stephen J. Etzkorn, Woodbury, MN (US); Robert L. Endres, Eau Claire, WI (US); Matthew B. Johnson, Woodbury, MN (US)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 96 days.

(21) Appl. No.: 14/360,105

(22) PCT Filed: Nov. 21, 2012

(86) PCT No.: PCT/US2012/066213
§ 371 (c)(1),
(2) Date: May 22, 2014

(87) PCT Pub. No.: WO2013/078278
PCT Pub. Date: May 30, 2013

(65) Prior Publication Data
US 2014/0285749 A1    Sep. 25, 2014

Related U.S. Application Data

(60) Provisional application No. 61/563,145, filed on Nov. 23, 2011.

(51) Int. Cl.
*G02F 1/1335*    (2006.01)

(52) U.S. Cl.
CPC .. *G02F 1/133606* (2013.01); *G02F 1/133504* (2013.01); *G02F 1/133536* (2013.01); *G02F 2001/133607* (2013.01)

(58) Field of Classification Search
CPC ......... G02F 1/133606; G02F 1/133536; G02F 1/133504; G02F 2001/133607
(Continued)

(56) References Cited

U.S. PATENT DOCUMENTS 5,175,030 A    12/1992 Lu
5,183,597 A    2/1993 Lu
(Continued)

FOREIGN PATENT DOCUMENTS

WO    WO 00-48037      8/2000
WO    WO 2006-026743   3/2006
(Continued)

OTHER PUBLICATIONS

International Search Report for International Application No. PCT/US2012/066213 mailed on Feb. 4, 2013, 3 pgs.

*Primary Examiner* — Charles Chang
(74) *Attorney, Agent, or Firm* — Daniel J. Iden (57) ABSTRACT

The present disclosure describes an optical stack that includes an asymmetric diffuser. As described herein, use of an asymmetric diffuser in an optical stack reduces undesirable defects in a display while maintaining optical gain and/or contrast of the display. The asymmetric diffuser is less diffusive along a first direction that is parallel with linearly extending structures of an associated light directing film.

9 Claims, 3 Drawing Sheets (58) Field of Classification Search
USPC .................................................. 349/58–65
See application file for complete search history.

(56) References Cited

U.S. PATENT DOCUMENTS

| | | |
|---|---|---|
| 6,364,497 B1 | 4/2002 | Park |
| 6,719,426 B2 | 4/2004 | Magarill |
| 7,328,638 B2 | 2/2008 | Gardiner |
| 7,350,442 B2 | 4/2008 | Ehnes |
| 7,648,849 B2 | 1/2010 | Lee |
| 7,905,647 B2 | 3/2011 | Soh et al. |
| 2006/0056166 A1* | 3/2006 | Yeo ..................... G02B 6/0041 362/19 |
| 2006/0082698 A1* | 4/2006 | Ko ..................... G02F 1/133606 349/61 |
| 2006/1204744 | 9/2006 | Hiraishi et al. |
| 2008/0064133 A1 | 3/2008 | Lee |
| 2009/0040772 A1* | 2/2009 | Laney ................. G02B 5/0242 362/353 |
| 2009/0079909 A1* | 3/2009 | Ouderkirk ............ B29C 55/023 349/67 |

FOREIGN PATENT DOCUMENTS

| | | |
|---|---|---|
| WO | WO 2008061125 A1 | 5/2008 |
| WO | 2010/141261 A2 | 12/2010 |
| WO | WO 2011-005897 | 1/2011 |
| WO | WO 2011-028373 | 3/2011 |

* cited by examiner

OPTICAL STACK WITH ASYMMETRIC DIFFUSER

FIELD

The present disclosure relates to, among other things, an optical display that includes an asymmetric diffuser.

BACKGROUND

Display systems, such as liquid crystal display (LCD) systems, are used in a variety of applications and commercially available devices such as, for example, computer monitors, personal digital assistants (PDAs), mobile phones, miniature music players, and thin LCD televisions. Many LCDs include a liquid crystal panel and an extended area light source, often referred to as a backlight, for illuminating the liquid crystal panel. Backlights can include one or more lamps and a number of light management films.

BRIEF SUMMARY

The present disclosure describes an optical stack that includes an asymmetric diffuser, among other aspects.

In many embodiments, an optical stack is described. The optical stack includes a first optical stack and a second optical stack disposed on the first optical stack. The first optical stack includes a light directing film having an average effective transmission of at least 1.3 and having a structured first major surface of a plurality of linear structures extending along a first direction. The second optical stack includes a liquid crystal panel, a reflective polarizer disposed on the liquid crystal panel, and an asymmetric light diffuser disposed on the reflective polarizer. The asymmetric light diffuser being less diffusive along the first direction and more diffusive along a second direction orthogonal to the first direction. The reflective polarizer substantially reflecting light having a first polarization state and substantially transmitting light having a second polarization state perpendicular to the first polarization state. Substantial portions of each two neighboring major surfaces in the second optical stack being in physical contact with each other. An average effective transmission of the optical stack is monotonically non-increasing as a function of a viewing angle as the viewing angle increases from about 35 degrees to about 55 degrees.

The optical stacks and corresponding displays described herein may provide one or more advantages over prior optical stacks or displays. For example, prior displays suffered from undesirable defects such as moire and other optical defects. Prior attempts to hide these undesirable defects resulted in a reduced optical gain and reduced contrast in the display. This disclosure describes the use of an asymmetric diffuser that reduces the undesirable defects while maintaining optical gain and/or contrast of the display. These and other advantages of the various embodiments of the optical stacks and displays described herein will be readily apparent to those of skill in the art upon reading the disclosure presented herein.

BRIEF DESCRIPTION OF THE DRAWINGS

The disclosure may be more completely understood in consideration of the following detailed description of various embodiments of the disclosure in connection with the accompanying drawings, in which.

The schematic drawings presented herein are not necessarily to scale. Like numbers used in the figures refer to like components, steps and the like. However, it will be understood that the use of a number to refer to a component in a given figure is not intended to limit the component in another figure labeled with the same number. In addition, the use of different numbers to refer to components is not intended to indicate that the different numbered components cannot be the same or similar.

DETAILED DESCRIPTION

In the following detailed description, reference is made to the accompanying drawings that form a part hereof, and in which are shown by way of illustration several specific embodiments of devices, systems and methods. It is to be understood that other embodiments are contemplated and may be made without departing from the scope or spirit of the present disclosure. The following detailed description, therefore, is not to be taken in a limiting sense.

All scientific and technical terms used herein have meanings commonly used in the art unless otherwise specified. The definitions provided herein are to facilitate understanding of certain terms used frequently herein and are not meant to limit the scope of the present disclosure.

As used in this specification and the appended claims, the singular forms "a", "an", and "the" encompass embodiments having plural referents, unless the content clearly dictates otherwise.

As used in this specification and the appended claims, the term "or" is generally employed in its sense including "and/or" unless the content clearly dictates otherwise.

As used herein, "have", "having", "include", "including", "comprise", "comprising" or the like are used in their open ended sense, and generally mean "including, but not limited to." It will be understood that the terms "consisting of" and "consisting essentially of" are subsumed in the term "comprising," and the like.

Any direction referred to herein, such as "top," "bottom," "left," "right," "upper," "lower," "above," below," and other directions and orientations are described herein for clarity in reference to the figures and are not to be limiting of an actual device or system or use of the device or system. Many of the devices, articles or systems described herein may be used in a number of directions and orientations.

The present disclosure describes, among other things, an optical stack that includes an asymmetric diffuser. As described herein, use of an asymmetric diffuser in an optical stack reduces undesirable defects in a display while maintaining optical gain and/or contrast of the display. The asymmetric diffuser is less diffusive along a first direction that is parallel with linearly extending structures of an associated light directing film. While the present disclosure is not so limited, an appreciation of various aspects of the disclosure will be gained through a discussion of the examples provided below.

Figure 1:
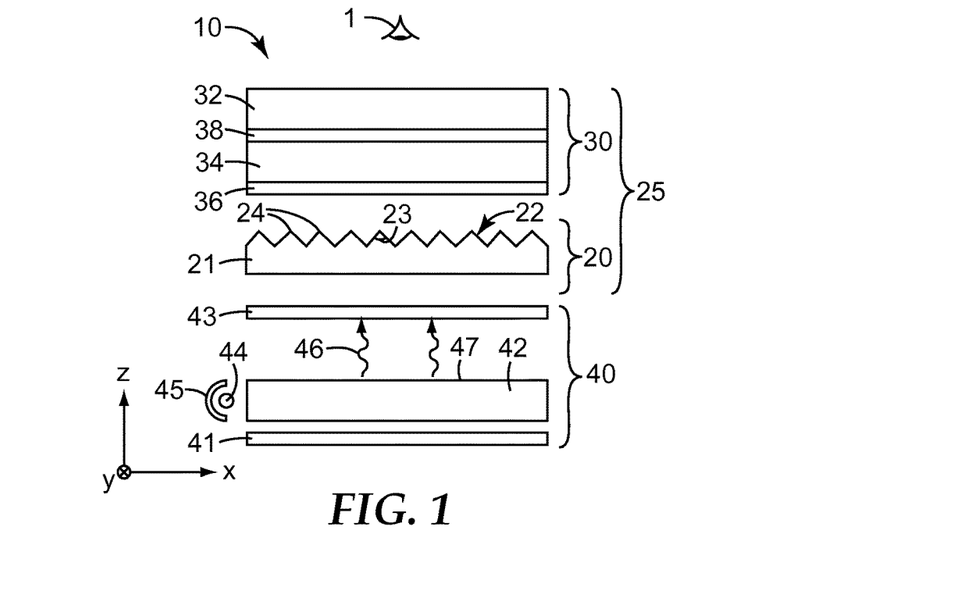
FIG. 1 is a schematic diagram side view of an illustrative display.

FIG. 1 is a schematic diagram side view of an illustrative display 10 for displaying information to a viewer 1. The display 10 includes a first optical stack 20 optically disposed between a second optical stack 30 and a backlight 40. The first optical stack 20 and the second optical stack 30 form an optical stack 25.

The first optical stack 20 includes a light redirecting film 21. The light redirecting film 21 includes a structured surface 22 having a plurality of linear structures 24 extending along a first direction or y-axis. In many embodiments, the linear structures 24 can face the second optical stack 30. In some embodiments, the linear structures 24 can face away from the second optical stack 30 or face toward the backlight 40. The linear structures 24 can be spaced apart from the second optical stack 30 or an air gap can separate at least a portion of the linear structures 24 from the second optical stack 30. The linear structures 24 can be prism or prismatic structures having an apex or peak angle in a range from 70 to 120 degrees, or in a range from 80 to 110 degrees, in a range from 85 to 95 degrees, in a range from 88 to 92 degrees, in a range from 89 to 90 degrees.

The second optical stack 30 includes a liquid crystal panel 32, a reflective polarizer 34 disposed on the liquid crystal panel 32 and an asymmetric diffuser 36 disposed on the reflective polarizer 34. In some embodiments an adhesive layer 38 adheres the liquid crystal panel 32 to the reflective polarizer 34. In many embodiments the asymmetric diffuser 36 faces the first optical stack 20 or the structured surface 22. In some embodiments an air gap 38 separates the liquid crystal panel 32 from the reflective polarizer 34. In these embodiments the asymmetric diffuser 36 faces away from the first optical stack 20 or the structured surface 22 and faces the liquid crystal panel 32.

The liquid crystal panel 32 can have any useful size and in many embodiments is utilized as a television. In many embodiments the liquid crystal panel 32 has a lateral or diagonal dimension that is at least 50 cm or at least 75 cm. In many embodiments substantial portions of each two neighboring surfaces in the second optical stack 30 are in physical contact with each other. For example, at least 50%, or at least 60%, or at least 70%, or at least 80%, or at least 90% of each two neighboring surfaces in the second optical stack 30 are in physical contact with each other. In some embodiments each layer in the second optical stack 30 is either directly formed on a neighboring layer in the second optical stack or is adhered to the neighboring layer via an adhesive. Thus in these embodiments neighboring layers in the second optical stack are not spaced apart from each other or separated by an air gap.

The illustrative backlight 40 includes a lightguide 42 that receives light through an edge of the lightguide 42 from a lamp or light source 44 that is housed in a side reflector 45. A back reflector 41 reflects light that is incident on the back reflector 41 toward viewer 1 and an optical diffuser 43 for homogenizes light 46 that exits an emitting surface 47 of the lightguide 42. In other embodiments the backlight is direct lit (not shown).

Reflective polarizer 34 substantially reflects light that has a first polarization state and substantially transmits light that has a second polarization state, where the two polarization states are mutually orthogonal or perpendicular to each other. For example, the average reflectance of reflective polarizer 34 in the visible for the polarization state that is substantially reflected by the reflective polarizer is at least about 50%, or at least about 60%, or at least about 70%, or at least about 80%, or at least about 90%, or at least about 95%. As another example, the average transmittance of reflective polarizer 34 in the visible for the polarization state that is substantially transmitted by the reflective polarizer is at least about 50%, or at least about 60%, or at least about 70%, or at least about 80%, or at least about 90%, or at least about 95%, or at least about 97%, or at least about 98%, or at least about 99%. In some cases, reflective polarizer 34 substantially reflects light having a first linear polarization state (for example, along the x-direction) and substantially transmits light having a second linear polarization state (for example, along the y-direction).

Any suitable type of reflective polarizer may be used for reflective polarizer layer 34 such as, for example, a multi-layer optical film (MOF) reflective polarizer, a diffusely reflective polarizing film (DRPF) having a continuous phase and a disperse phase, such as a Vikuiti™ Diffuse Reflective Polarizer Film ("DRPF") available from 3M Company, St. Paul, Minn., a wire grid reflective polarizer described in, for example, U.S. Pat. No. 6,719,426, or a cholesteric reflective polarizer.

For example, in some cases, reflective polarizer 34 can be or include an MOF reflective polarizer, formed of alternating layers of different polymer materials, where one of the sets of alternating layers is formed of a birefringent material, where the refractive indices of the different materials are matched for light polarized in one linear polarization state and unmatched for light in the orthogonal linear polarization state. In such cases, an incident light in the matched polarization state is substantially transmitted through reflective polarizer 34 and an incident light in the unmatched polarization state is substantially reflected by reflective polarizer 34. In some cases, an MOF reflective polarizer 34 can include a stack of inorganic dielectric layer.

As another example, reflective polarizer 34 can be or include a partially reflecting layer that has an intermediate on-axis average reflectance in the pass state. For example, the partially reflecting layer can have an on-axis average reflectance of at least about 90% for visible light polarized in a first plane, such as the xy-plane, and an on-axis average reflectance in a range from about 25% to about 90% for visible light polarized in a second plane, such as the xz-plane, perpendicular to the first plane. Such partially reflecting layers are described in, for example, U.S. Patent Publication No. 2008/064133, the disclosure of which is incorporated herein in its entirety by reference.

In some cases, reflective polarizer 34 can be or include a circular reflective polarizer, where light circularly polarized in one sense, which may be the clockwise or counterclockwise sense (also referred to as right or left circular polarization), is preferentially transmitted and light polarized in the opposite sense is preferentially reflected. One type of circular polarizer includes a cholesteric liquid crystal polarizer.

Optical diffuser 43 has the primary functions of hiding or masking lamp or light source 44 and homogenizing light 46 that is emitted by lightguide 42 at light emission surface 47. Optical diffuser 43 has a high optical haze and/or a high diffuse optical reflectance. In many embodiments, the optical haze of the optical diffuser 43 is not less than about 40%, or not less than about 50%, or not less than about 60%, or not less than about 70%, or not less than about 80%, or not less than about 85%, or not less than about 90%, or not less than about 95%. As another example, the diffuse optical reflectance of the optical diffuser is not less than about 30%, or not less than about 40%, or not less than about 50%, or not less than about 60%. Optical diffuser 43 can be or include any optical diffuser that may be desirable and/or available in an application. For example, optical diffuser 43 can be or include a surface diffuser, a volume diffuser, or a combination thereof.

Back reflector 41 receives light that is emitted by the lightguide 42 away from viewer 1 along the negative z-direction and reflects the received light towards the viewer 1. Display systems such as display system 10 where lamp or light source 44 is placed along an edge of a lightguide, are generally referred to as edge-lit or backlit displays or optical systems. Back reflector 41 can be any type reflector that may be desirable and/or practical in an application. For example, the back reflector can be a specular reflector, a semi-specular or semi-diffuse reflector, or a diffuse reflector. For example, the reflector can be an aluminized film or a multilayer polymeric reflective film, such as an enhanced specular reflector (ESR) film (available from 3M Company, St. Paul, Minn.).

The asymmetric diffuser 36 can be a volume light diffuser or a surface light diffuser. The asymmetric diffuser 36 is less diffusive along a first direction and more diffusive along a second direction where the second direction is orthogonal to the first direction. In many embodiments the first direction is parallel or aligned along the first direction or y-axis of the linear structures 24 of the light redirecting film 20. In these embodiments the linear structures 24 of the light redirecting film 20 extend in the first direction along the y-axis and the asymmetric diffuser 36 is less diffusive along the same first direction along the y-axis. It has been found that orientating the asymmetric diffuser 36 and the linear structures 24 of the light redirecting film 20 in this manner maintains the brightness and contrast of a display while masking or eliminating undesirable optical defects in the display. In some embodiments, it may be desirable for there to be some non-zero angle between the linearly extending direction of the prism structures 24 and the less diffusive direction of the asymmetric diffuser 36.

In many embodiments, the asymmetric light diffuser 36 scatters light along the first direction with a first viewing angle and along the second direction with a second viewing angle a ratio of the second viewing angle to the first viewing angle being at least 1.5, or being at least 2, or being at least 2.5, or being at least 3.

A light redirecting film 20 used in a liquid crystal display system can increase or improve the brightness of the display. In these cases, the light redirecting film has an effective transmission (ET) or relative gain that is greater than 1. As used herein, "effective transmission" is the ratio of the luminance of the display system with the film is in place in the display system to the luminance of the display without the film in place.

Figure 2:
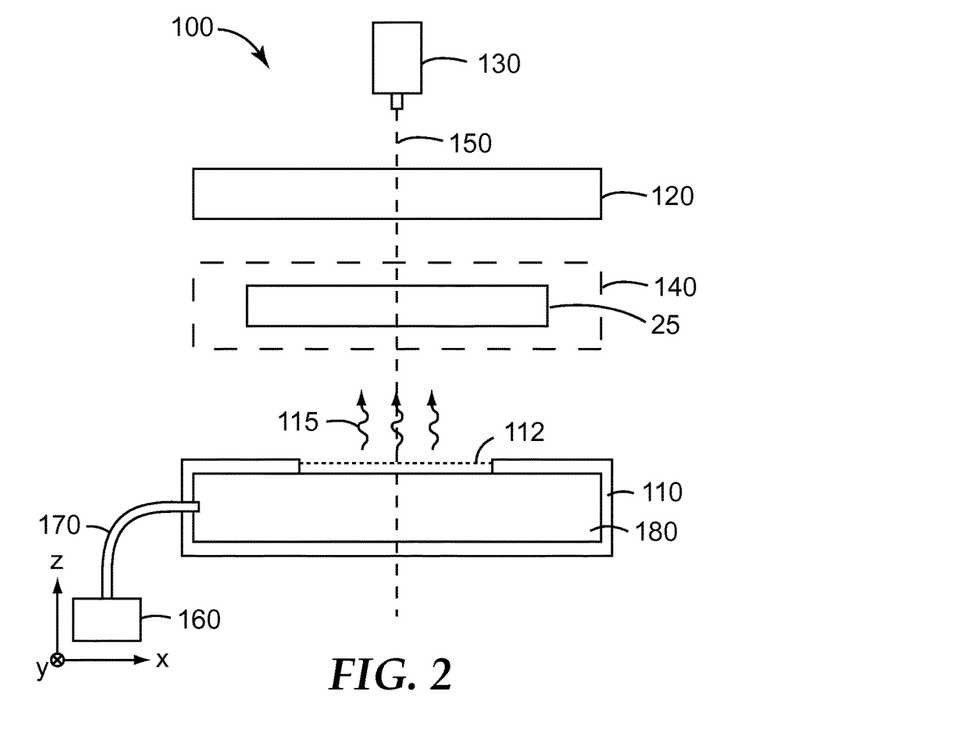
FIG. 2 is a schematic side-view of an optical system for measuring effective transmission.

FIG. 2 is a schematic side-view of an optical system 100 for measuring effective transmission. Optical system 100 is centered on an optical axis 150 and includes a hollow lambertian light box 110 that emits a lambertian light 115 through an emitting or exit surface 112, a linear light absorbing polarizer 120, and a photo detector 130. Light box 110 is illuminated by a stabilized broadband light source 160 that is connected to an interior 180 of the light box via an optical fiber 170. A test sample the ET of which is to be measured by the optical system, is placed at location 140 between the light box and the absorbing linear polarizer.

The ET of light optical stack 25 or light directing film 20 can be measured by placing the optical stack 25 or light directing film 20 at location 140 with linear prisms 22 facing the photo detector. The spectrally weighted axial luminance $I_1$ (luminance along optical axis 250) is measured through the linear absorbing polarizer by the photo detector. The light optical stack 25 or light directing film 20 is removed and the spectrally weighted luminance $I_2$ is measured without the optical stack 25 or light directing film 20 placed at location 140. ET is the ratio $I_1/I_2$. ET0 is the effective transmission when linear prisms 22 extend along a direction that is parallel to the polarizing axis of linear absorbing polarizer 120, and ET90 is the effective transmission when linear prisms 22 extend along a direction that is perpendicular to the polarizing axis of the linear absorbing polarizer. The average effective transmission (ETA) is the average of ET0 and ET90.

Measured effective transmission values disclosed herein were measured using a SpectraScan™ PR-650 SpectraColorimeter (available from Photo Research, Inc, Chatsworth, Calif.) for photo detector 130. Light box 110 was a Teflon cube with a total reflectance of about 85%.

In some cases, such as when light redirecting film 20 is used in a display system 10 to increase the brightness and the linear prisms have an index of refraction that is greater than about 1.6, the average effective transmission (ETA) of the light redirecting film is not less than about 1.3, or not less than about 1.4, or not less than about 1.5, or not less than about 1.6, or not less than about 1.65, or not less than about 1.7, or not less than about 1.75, or not less than about 1.8.

As illustrated in the examples, the average effective transmission of the optical stack 25 smoothly decreases as the viewing angle increases. This optical characteristic reduces or eliminates optical defects as a viewer changes viewing angle. In many embodiments the average effective transmission of the optical stack 25 monotonically decreases as the viewing angle increases from about 35 degrees to about 55 degrees, or from 30 degrees to about 60 degrees, or from 25 degrees to about 65 degrees, or from 20 degrees to about 70 degrees, or from 15 degrees to about 75 degrees, or from 10 degrees to about 80 degrees, or from 5 degrees to about 85 degrees. In some embodiments the average effective transmission of the optical stack 25 monotonically decreases or remains constant as the viewing angle increases from about 5 degrees to about 85 degrees.

In many embodiments the average effective transmission of the optical stack 25 is not less or is less by no more than about 15% as compared to an optical stack that has the same construction except for not comprising the asymmetric light diffuser. In other embodiments the average effective transmission of the optical stack 25 is not less or is less by no more than about 10% as compared to an optical stack that has the same construction except for not comprising the asymmetric light diffuser. In other embodiments the average effective transmission of the optical stack 25 is not less or is less by no more than about 8% as compared to an optical stack that has the same construction except for not comprising the asymmetric light diffuser. In other embodiments the average effective transmission of the optical stack 25 is not less or is less by no more than about 5% as compared to an optical stack that has the same construction except for not comprising the asymmetric light diffuser.

Example 1

An optical stack was assembled as follows. An LCD panel was obtained from a Sony NSX-32GT1 television set (available from Sony USA, New York N.Y.). A sheet of reflective polarizer (DBEF-Q, available from 3M Company, St. Paul Minn.) was laminated to the underside of the panel using an optically clear adhesive (available as OCA 8171 from 3M Company) with the pass axis of the polarizer oriented along the horizontal direction of the LCD panel. Formed on the side of reflective polarizer sheet facing away from the LCD panel was an asymmetric diffuser that is described in greater detail below; this asymmetric diffuser had parallel sets of structures, each structure with the approximate shape of an elongated ellipse. The asymmetric diffuser was oriented so that the long axes of the ellipses were parallel to the pass axis of the reflective polarizer; oriented in this way, the direction of maximum diffusion was vertical, perpendicular to the pass axis. Beneath the reflective polarizer sheet, and separated from it by an air gap, was a prism film (BEF III-10T, with 90 degree apex angle and 50 micrometers pitch, available from 3M Company). The prisms were oriented generally parallel to the long direction of the elongated ellipses. Directly below the prism film, and separated from it by an air gap, was a microlens sheet (diffuser) obtained from a Samsung UN32C4000 television set (available from Samsung USA, Richfield Park N.J.). Immediately below the microlens sheet, and separated from it by an air gap, was a light guide plate also taken from a Sony NSX-32GT1 television set. The light guide from this set was lit at the top edge using eighty 3 mm by 5 mm LEDs.

Figure 3:
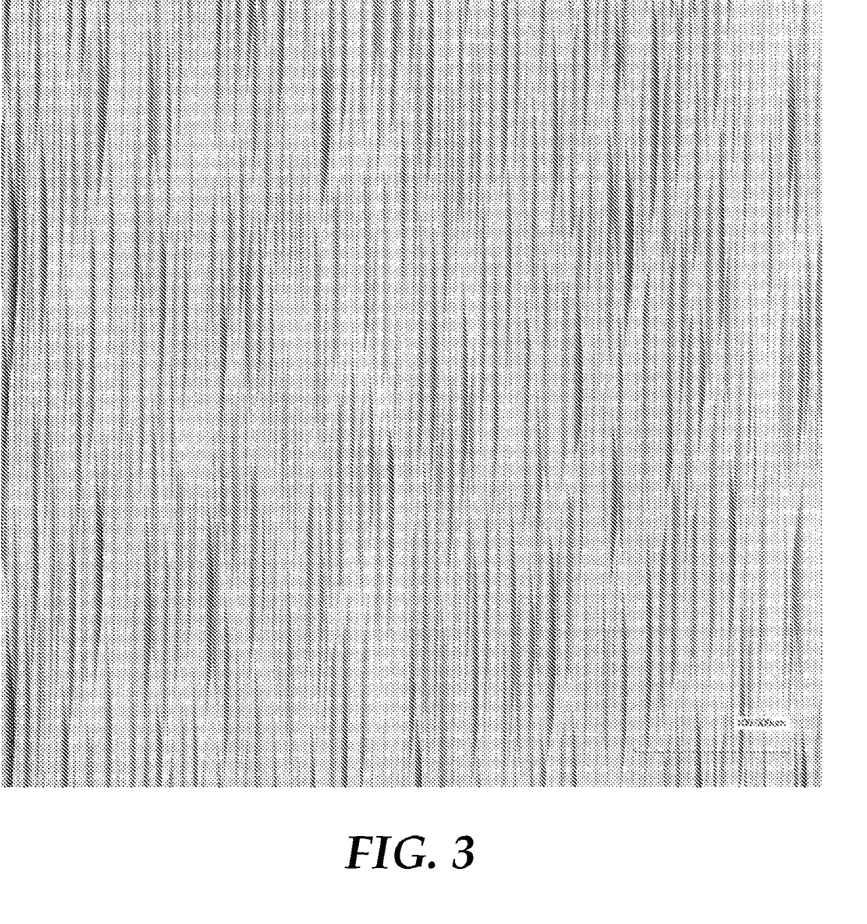
FIG. 3 is a a top-view optical micrograph of an illustrative asymmetric diffuser.

The asymmetric diffuser on the underside of the reflective polarizer was prepared as follows. A diamond turning system with a fast tool servo (FTS) described, for example, in PCT Published Application No. WO 00/48037 and U.S. Pat. Nos. 7,350,442 and 7,328,638, was used to create a cylindrical microreplication tool. As the cylinder rotated along its central axis, a diamond cutter moved normal to the cylinder's surface to cut a thread path around the cylindrical roll. As cutter moved along a direction normal to the roll surface to cut the roll material, the width of the material cut by the cutter changed as the cutter moved or plunged in and out. The process for creating the microreplication tool is described further in PCT Published Application No. WO2010/041261 and U.S. pending patent application 61/236772. The structures created in the cylindrical tool were then replicated on the underside of the reflective polarizer using the method described in U.S. Pat. No. 5,175,030 (Lu) and U.S. Pat. No. 5,183,597 (Lu). FIG. 3 is a top-view optical micrograph of the asymmetric diffuser.

The elongated structures shown in FIG. 3 have an average length of about 160 micrometers and an average width at the widest part of approximately 10 micrometers. The average maximum height of the structures was approximately 2 micrometers.

Figure 4:
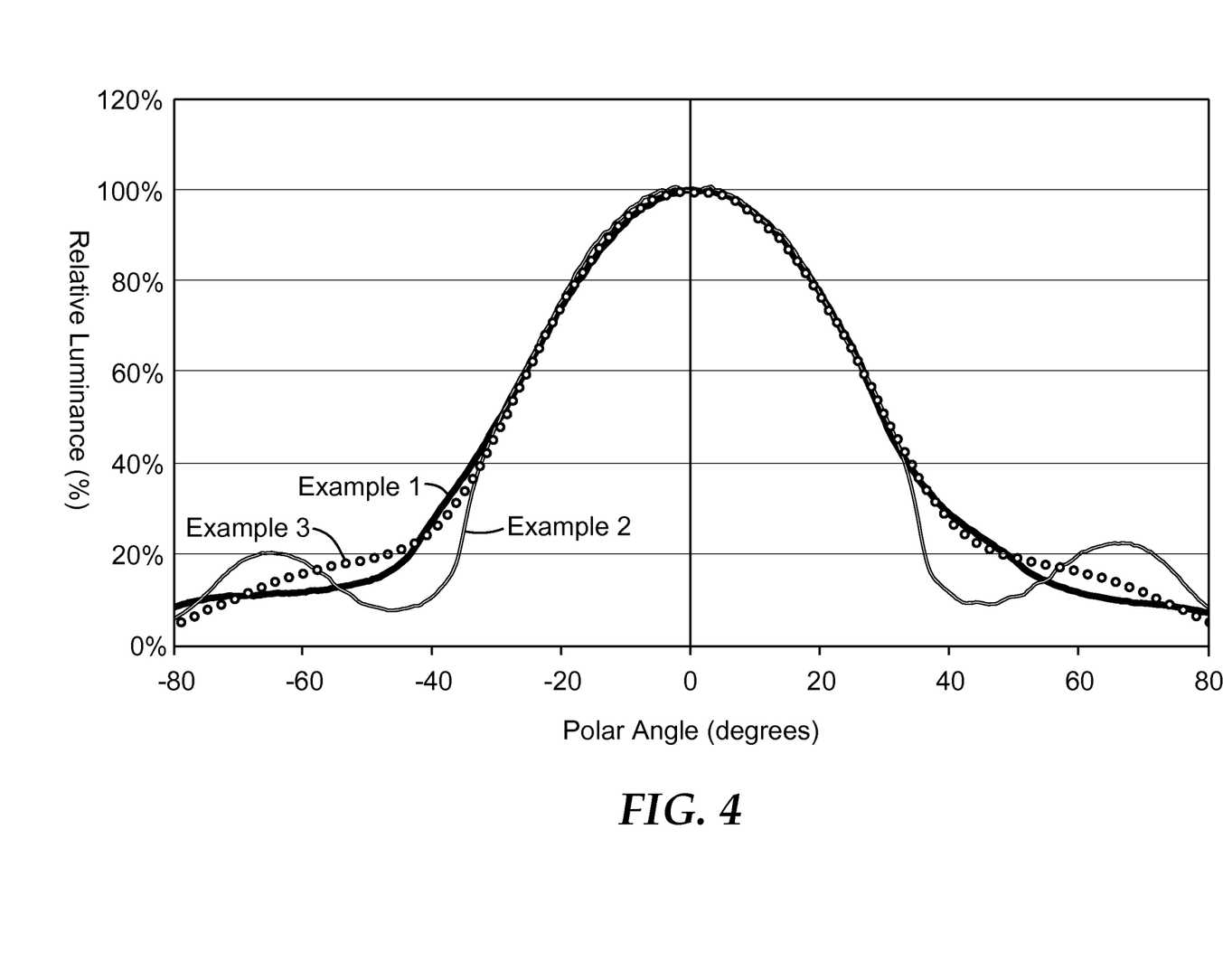
FIG. 4 is a graph of luminance (effective transmission) of the display as a function of vertical polar angle.

The luminance (effective transmission) of the display as a function of vertical polar angle was measured using an Eldim EZContrast88LW (available from Market Tech Inc., Scotts Valley Calif.). The resulting data are shown in the plot of FIG. 4.

Example 2

An optical stack was assembled as in Example 1, except that the asymmetric diffuser structures were formed perpendicular to their direction in that example, so that they were approximately perpendicular to the prisms. In this orientation, the direction of the maximum diffusion was horizontal.

The luminance (effective transmission) of the display as a function of vertical polar angle was measured as described in Example 1. The resulting data are shown in the plot of FIG. 4.

Example 3

An optical stack was assembled as in Example 1, except that the reflective polarizer film with asymmetric diffuser was replaced by a reflective polarizer with no diffuser (DBEF-Q, available from 3M Company).

The luminance (effective transmission) of the display as a function of vertical polar angle was measured as described in Example 1. The resulting data are shown in the plot of FIG. 4.

Example 4

Viewing angle was measured for a single film consisting of the reflective polarizer with asymmetric diffuser of Example 1. The horizontal viewing angle (the angle at which brightness falls to one-half of its peak value) was determined to be 1.5 degrees and the vertical viewing angle was 17.1 degrees. These were measured with a collimated light source and a radiant imaging sphere (available as the IS-Sa Scatter and Appearance Measurement System from Radiant ZEMAX, LLC, Redmond Wash.).

Example 5

Viewing angle was measured with a single film consisting of DBEF-D2-400 (available from 3M Company), a reflective polarizer with a conventional symmetric diffuser. The viewing angles were measured as in Example 4 and were determined to be 11.3 degrees in the horizontal and 12.8 degrees in the vertical.

Example 6

Axial luminance was measured for the optical stacks of Examples 1, 2 and 3 using a PR705 SpectraScan spectroradiometer (available from Photo Research Inc., Chatsworth Calif.). The optical assembly of Examples 1 and 2 were found to have 91% of the axial luminance of the optical assembly of Example 3.

Thus, embodiments of OPTICAL STACK WITH ASYMMETRIC DIFFUSER are disclosed. One skilled in the art will appreciate that the optical films and film articles described herein can be practiced with embodiments other than those disclosed. The disclosed embodiments are presented for purposes of illustration and not limitation.

Exemplary embodiments include the following:

Item 1. A optical stack comprising:
a first optical stack and a second optical stack disposed on the first optical stack, the first optical stack comprising:
  a light directing film having an average effective transmission of at least 1.3 and comprising a structured first major surface comprising a plurality of linear structures extending along a first direction,
the second optical stack comprising:
  a liquid crystal panel;
  a reflective polarizer disposed on the liquid crystal panel, the reflective polarizer substantially reflecting light having a first polarization state and substantially transmitting light having a second polarization state perpendicular to the first polarization state; and
  an asymmetric light diffuser disposed on the reflective polarizer and being less diffusive along the first direction and more diffusive along a second direction orthogonal to the first direction, substantial portions of each two neighboring major surfaces in the second optical stack being in physical contact with each other, wherein an average effective transmission of the optical stack is monotonically non-increasing as a function of a viewing angle as the viewing angle increases from about 35 degrees to about 55 degrees.

Item 2. The optical stack of item 1, wherein the light directing film has an average effective transmission of at least 1.4.

Item 3. The optical stack of item 1, wherein the light directing film has an average effective transmission of at least 1.5.

Item 4. The optical stack of item 1, wherein the light directing film has an average effective transmission of at least 1.6.

Item 5. The optical stack of item 1, wherein the plurality of linear structures in the first major surface of the light directing film comprises a plurality of linear prismatic structures extending along the first direction.

Item 6. The optical stack of item 5, wherein each linear prismatic structure has a peak and a peak angle, the peak angle being in a range from 70 to 120 degrees.

Item 7. The optical stack of item 5, wherein each linear prismatic structure has a peak and a peak angle, the peak angle being in a range from 80 to 110 degrees.

Item 8. The optical stack of item 5, wherein each linear prismatic structure has a peak and a peak angle, the peak angle being in a range from 85 to 95 degrees.

Item 9. The optical stack of item 5, wherein each linear prismatic structure has a peak and a peak angle, the peak angle being in a range from 88 to 92 degrees.

Item 10. The optical stack of item 1, wherein the structured first major surface of the light directing film faces the second optical stack.

Item 11. The optical stack of item 1, wherein the structured first major surface of the light directing film faces away from the second optical stack.

Item 12. The optical stack of item 1, wherein the light directing film comprises a second major surface opposite the structured first major surface, the second major surface being structured.

Item 13. The optical stack of item 1, wherein the light directing film comprises a second major surface opposite the structured first major surface, the second major surface not being structured.

Item 14. The optical stack of item 1, wherein a major surface of the liquid crystal panel has a diagonal that is at least 50 cm.

Item 15. The optical stack of item 1, wherein a major surface of the liquid crystal panel has a diagonal that is at least 75 cm.

Item 16. The optical stack of item 1, wherein the reflective polarizer reflects at least 60% of light having the first polarization state and transmits at least 60% of light having the second polarization state.

Item 17. The optical stack of item 1, wherein the reflective polarizer reflects at least 70% of light having the first polarization state and transmits at least 70% of light having the second polarization state.

Item 18. The optical stack of item 1, wherein the reflective polarizer reflects at least 80% of light having the first polarization state and transmits at least 80% of light having the second polarization state.

Item 19. The optical stack of item 1, wherein the reflective polarizer reflects at least 90% of light having the first polarization state and transmits at least 90% of light having the second polarization state.

Item 20. The optical stack of item 1, wherein the asymmetric light diffuser comprises a volume light diffuser.

Item 21. The optical stack of item 1, wherein the asymmetric light diffuser comprises a surface light diffuser.

Item 22. The optical stack of item 1, wherein the asymmetric light diffuser scatters light along the first direction with a first viewing angle and along the second direction with a second viewing angle a ratio of the second viewing angle to the first viewing angle being at least 1.5.

Item 23. The optical stack of item 1, wherein the asymmetric light diffuser scatters light along the first direction with a first viewing angle and along the second direction with a second viewing angle a ratio of the second viewing angle to the first viewing angle being at least 2.

Item 24. The optical stack of item 1, wherein the asymmetric light diffuser scatters light along the first direction with a first viewing angle and along the second direction with a second viewing angle a ratio of the second viewing angle to the first viewing angle being at least 2.5.

Item 25. The optical stack of item 1, wherein the asymmetric light diffuser scatters light along the first direction with a first viewing angle and along the second direction with a second viewing angle a ratio of the second viewing angle to the first viewing angle being at least 3.

Item 26. The optical stack of item 1, wherein at least 50% of each two neighboring major surfaces in the second optical stack are in physical contact with each other.

Item 27. The optical stack of item 1, wherein at least 60% of each two neighboring major surfaces in the second optical stack are in physical contact with each other.

Item 28. The optical stack of item 1, wherein at least 70% of each two neighboring major surfaces in the second optical stack are in physical contact with each other.

Item 29. The optical stack of item 1, wherein at least 80% of each two neighboring major surfaces in the second optical stack are in physical contact with each other.

Item 30. The optical stack of item 1, wherein at least 90% of each two neighboring major surfaces in the second optical stack are in physical contact with each other.

Item 31. The optical stack of item 1, wherein each layer in the second optical stack is either directly formed on a neighboring layer in the second optical stack or is adhered to the neighboring layer via an adhesive.

Item 32. The optical stack of item 1, wherein the average effective transmission of the optical stack monotonically decreases as a viewing angle increases from about 30 degrees to about 60 degrees.

Item 33. The optical stack of item 1, wherein the average effective transmission of the optical stack monotonically decreases as a viewing angle increases from about 25 degrees to about 65 degrees.

Item 34. The optical stack of item 1, wherein the average effective transmission of the optical stack monotonically decreases as a viewing angle increases from about 20 degrees to about 70 degrees.

Item 35. The optical stack of item 1, wherein the average effective transmission of the optical stack monotonically decreases as a viewing angle increases from about 15 degrees to about 75 degrees.

Item 36. The optical stack of item 1, wherein the average effective transmission of the optical stack monotonically decreases as a viewing angle increases from about 10 degrees to about 80 degrees.

Item 37. The optical stack of item 1, wherein the average effective transmission of the optical stack monotonically decreases as a viewing angle increases from about 5 degrees to about 85 degrees.

Item 38. The optical stack of item 37, wherein the average effective transmission of the optical stack remains constant as the viewing angle increases within a portion of the viewing angle range from 5 to 85 degrees.

Item 39. The optical stack of item 1 comprising an air gap between the first and second optical stacks.

Item 40. The optical stack of item 1, wherein the average effective transmission of the optical stack is not less or is less by no more than about 15% as compared to an optical stack that has the same construction except for not comprising the asymmetric light diffuser.

Item 41. The optical stack of item 1, wherein the average effective transmission of the optical stack is not less or is less by no more than about 10% as compared to an optical stack that has the same construction except for not comprising the asymmetric light diffuser.

Item 42. The optical stack of item 1, wherein the average effective transmission of the optical stack is not less or is less by no more than about 8% as compared to an optical stack that has the same construction except for not comprising the asymmetric light diffuser.

Item 43. The optical stack of item 1, wherein the average effective transmission of the optical stack is not less or is less by no more than about 5% as compared to an optical stack that has the same construction except for not comprising the asymmetric light diffuser.

Item 44. The optical stack of item 1, wherein the asymmetric light diffuser faces the structured first major surface of the light directing film.

Item 45. The optical stack of item 1, wherein the asymmetric light diffuser faces away from the structured first major surface of the light directing film.

Item 46. The optical stack of item 1, wherein the reflective polarizer layer comprises alternating layers, at least one of the alternating layers comprising a birefringent material.

Item 47. The optical stack of item 1, wherein the reflective polarizer layer comprises a wire grid reflective polarizer.

Item 48. The optical stack of item 1, wherein the reflective polarizer layer comprises a cholesteric reflective polarizer.

Item 49. The optical stack of item 1, wherein the reflective polarizer layer comprises a plurality of substantially parallel fibers, the fibers comprising a birefringent material.

Item 50. The optical stack of item 1, wherein the reflective polarizer layer comprises a diffusely reflective polarizing film (DRPF).

What is claimed is:

1. A optical stack comprising:
a first optical stack and a second optical stack disposed on the first optical stack, the first optical stack comprising:
a light directing film having an average effective transmission of at least 1.3 and comprising a structured first major surface comprising a plurality of linear structures extending along a first direction,
the second optical stack comprising:
a liquid crystal panel;
a reflective polarizer disposed on the liquid crystal panel, the reflective polarizer substantially reflecting light having a first polarization state and substantially transmitting light having a second polarization state perpendicular to the first polarization state; and
an asymmetric light diffuser disposed on the reflective polarizer and being less diffusive along the first direction and more diffusive along a second direction orthogonal to the first direction, substantial portions of each two neighboring major surfaces in the second optical stack being in physical contact with each other, wherein an average effective transmission of the optical stack is monotonically non-increasing as a function of a viewing angle as the viewing angle increases from about 35 degrees to about 55 degrees, and wherein the asymmetric light diffuser scatters light along the first direction with a first viewing angle and along the second direction with a second viewing angle a ratio of the second viewing angle to the first viewing angle being at least 1.5.

2. The optical stack of claim 1, wherein the light directing film has an average effective transmission of at least 1.4.

3. The optical stack of claim 1, wherein the light directing film comprises a second major surface opposite the structured first major surface, the second major surface being structured.

4. The optical stack of claim 1, wherein the light directing film comprises a second major surface opposite the structured first major surface, the second major surface not being structured.

5. The optical stack of claim 1, wherein a major surface of the liquid crystal panel has a diagonal that is at least 50 cm.

6. The optical stack of claim 1, wherein at least 50% of each two neighboring major surfaces in the second optical stack are in physical contact with each other.

7. The optical stack of claim 1, wherein the average effective transmission of the optical stack monotonically decreases as a viewing angle increases from about 30 degrees to about 60 degrees.

8. The optical stack of claim 1 comprising an air gap between the first and second optical stacks.

9. The optical stack of claim 1, wherein the average effective transmission of the optical stack is not less or is less by no more than about 15% as compared to an optical stack that has the same construction except for not comprising the asymmetric light diffuser.

* * * * *